US012782884B2

(12) United States Patent
Paraschivescu

(10) Patent No.: US 12,782,884 B2
(45) Date of Patent: Nov. 3, 2026

(54) MODULE FOR CONTROLLING AN ELECTRONIC APPLIANCE ADAPTED TO WITHSTAND SHOCKS

(71) Applicant: ETA SA MANUFACTURE HORLOGERE SUISSE, Grenchen (CH)

(72) Inventor: Daniel Paraschivescu, Grenchen (CH)

(73) Assignee: ETA SA MANUFACTURE HORLOGERE SUISSE, Grenchen (CH)

( * ) Notice: Subject to any disclaimer, the term of this patent is extended or adjusted under 35 U.S.C. 154(b) by 206 days.

(21) Appl. No.: 18/501,485

(22) Filed: Nov. 3, 2023

(65) Prior Publication Data

US 2024/0192643 A1 Jun. 13, 2024

(30) Foreign Application Priority Data

Dec. 9, 2022 (EP) .................................... 22212607

(51) Int. Cl.
*G04G 17/02* (2006.01)
*G04G 21/08* (2010.01)

(52) U.S. Cl.
CPC ............. *G04G 17/02* (2013.01); *G04G 21/08* (2013.01)

(58) Field of Classification Search
CPC ........ G04G 17/02; G04G 21/08; G04C 3/001; G04B 37/04; G04B 31/02; H01H 3/60; H01H 3/38; H01H 1/26; H01H 1/24
See application file for complete search history.

(56) References Cited

U.S. PATENT DOCUMENTS 3,973,099 A 8/1976 Morris, Sr.
4,207,448 A 6/1980 Furusawa et al.
7,744,272 B2 * 6/2010 Hozumi ............... G04B 37/106 368/308
10,102,985 B1 * 10/2018 Pelletier ................. H01H 13/06
10,866,619 B1 * 12/2020 Bushnell ............... G06F 1/1656
2003/0174590 A1 9/2003 Arikawa et al.
2008/0289439 A1 * 11/2008 Miura .................... H01H 19/11 74/10.41
2013/0163395 A1 6/2013 Ferri et al.
(Continued)

FOREIGN PATENT DOCUMENTS

CN 101364079 A 2/2009
CN 221827200 U 10/2024
(Continued)

OTHER PUBLICATIONS

European Search Report for 22 21 2607 dated May 5, 2023.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A control module (10) of an electronic appliance including a push-piece (11) including a striker element (111), and a switch (12) adapted to occupy a connected state and an idle state. The striker element (111) is configured to drive the switch (12) into the connected state or into the idle state when the push-piece (11) is acted on. A shock absorber (116) is provided to absorb, by deforming elastically, a part of the forces involved when the striker element (111) drives the switch (12) into the connected state or into the idle state, at least when said forces are above a predetermined threshold.

8 Claims, 1 Drawing Sheet

(56) References Cited

U.S. PATENT DOCUMENTS

| | | | | |
|---|---|---|---|---|
| 2021/0125800 | A1* | 4/2021 | Otaka | H01H 13/06 |
| 2021/0166896 | A1* | 6/2021 | Ito | H01H 13/48 |
| 2021/0173351 | A1* | 6/2021 | Vuille | G01D 5/142 |

FOREIGN PATENT DOCUMENTS

| | | | |
|---|---|---|---|
| EP | 0 643 407 | A1 | 3/1995 |
| JP | 2013-134256 | A | 7/2013 |
| JP | 2022-139248 | A | 9/2022 |
| KR | 10-2017-0058126 | A | 5/2017 |

* cited by examiner

MODULE FOR CONTROLLING AN ELECTRONIC APPLIANCE ADAPTED TO WITHSTAND SHOCKS

CROSS REFERENCE TO RELATED APPLICATION

This application claims priority to European Patent Application No. 22212607.0 filed Dec. 9, 2022, the entire contents of which are incorporated herein by reference.

TECHNICAL FIELD OF THE INVENTION

The invention relates to the field of electronic appliances, and in particular members for controlling functions of an electronic appliance.

More particularly, the invention relates to a module for controlling an electronic appliance adapted to withstand shocks.

Advantageously, the present invention is particularly adapted to portable electronic appliances, for example electronic watches.

TECHNOLOGICAL BACKGROUND

Members for controlling electronic appliances generally consist of switches adapted to enable or prevent passage of a current for example for transmitting an instruction for implementing a function.

In particular, in order to enable or prevent passage of a current, the switches are designed so as to occupy an idle position and a connection position into at least one of which they are driven under the action of a user.

In particular switches are known comprising a flexible membrane covering an elastic blade adapted to connect connection terminals together when it is acted on by a user, i.e. when it is forced, and to prevent any connection between the terminals when it is at rest.

Electronic appliances often include a push-piece adapted to be manipulated by the user so as to come into contact with the flexible membrane of the switch, by means of a striker, in order to deform the elastic blade into the connection position thereof.

When the electronic apparatus suffers a shock at the push-piece, the elastic blade is able to deform plastically under the effects of the forces that are applied thereto, and consequently it risks suffering irreversible damage.

One solution for avoiding this problem consists in increasing the dimensions of the contact surface of the striker so that it distributes the forces transmitted to the maximum extent so as to reduce the pressure to which the elastic blade is subjected.

However, this solution may not be envisageable for applications in which the dimensions constitute critical design constraints, for example in microelectronic or micromechanical fields, such as the horology field.

Furthermore, it may not be possible to implement this solution, for example because of manufacturing constraints.

Another solution consists in providing an extra thickness in the flexible film, this film generally being produced from silicone, this extra thickness is designed to deform elastically during a shock in order to absorb the forces.

However, such an extra thickness is unsuitable for absorbing high forces, for example those generated by a shock corresponding to a deceleration of 5000 g, as specified in the standard NIHS 91-30. This is because the flexible film then deforms to such an extent under the effect of the forces received and transmits them to the elastic blade and to the terminal, which deform plastically.

SUMMARY OF THE INVENTION

In order to solve the aforementioned drawbacks, the present invention relates to a control module of an electronic appliance comprising:

- a push-piece comprising a striker element,
- a switch adapted to occupy a connected state and an idle state, said striker element being configured to drive the switch into the connected state or into the idle state when the push-piece is acted on,
- a shock absorber configured to absorb, by deforming elastically, a part of the forces involved when the striker element drives the switch into the connected state or into the idle state, at least when said forces are above a predetermined threshold.

It should be noted that, in the present invention, the switch can therefore advantageously be a standard commercially available component.

In particular implementations, the invention may further include one or more of the following features, taken alone or according to any technically possible combinations.

In particular implementations, the shock absorber is in the form of a disc.

In particular implementations, the shock absorber is intended to be arranged between a structure of the horological movement and the switch, in line with the direction of travel of the push-piece.

In particular implementations, the switch includes a frame against which the shock absorber is arranged in abutment so that said switch is interposed between the striker element and said shock absorber.

In particular implementations, the switch comprises connection terminals and an elastic blade all secured to the frame, the elastic blade being moved into a connection position in which it gives rise to contact between the connection terminals when the switch is in the connection state, and being moved into an idle state in which it prevents contact between the connection terminals when the switch is in the idle state, the shock absorber being arranged against at least one of the connection terminals so that the latter is interposed between the shock absorber and the striker element.

In particular implementations, the push-piece comprises a pusher head to which a pusher rod slidably engaged in a guide tube is connected and comprising a free end to which the striker element is secured, the push-piece comprising a spring interposed between the pusher head and the guide tube so as to force the push-piece to move towards an idle position.

In particular implementations, the striker element includes a body with a substantially cylindrical shape comprising a radial dimension extending in a direction orthogonal to the direction of movement of the push-piece, said radial dimension being less than the outside diameter of an end of the guide tube at which it is arranged.

According to another aspect, the present invention relates to a watch comprising a case in which an electronic horological movement is housed, the watch being characterised in that it includes a control module as previously described, the push-piece being engaged through a middle with which the case is provided and the switch being secured to a structure of the horological movement.

BRIEF DESCRIPTION OF THE FIGURES

Other features and advantages of the invention will become apparent upon reading the following detailed description given by way of non-limiting example, with reference to the appended drawings wherein.

It should be noted that the figures are not necessarily drawn to scale for reasons of clarity.

DETAILED DESCRIPTION OF THE INVENTION

Figure 2:
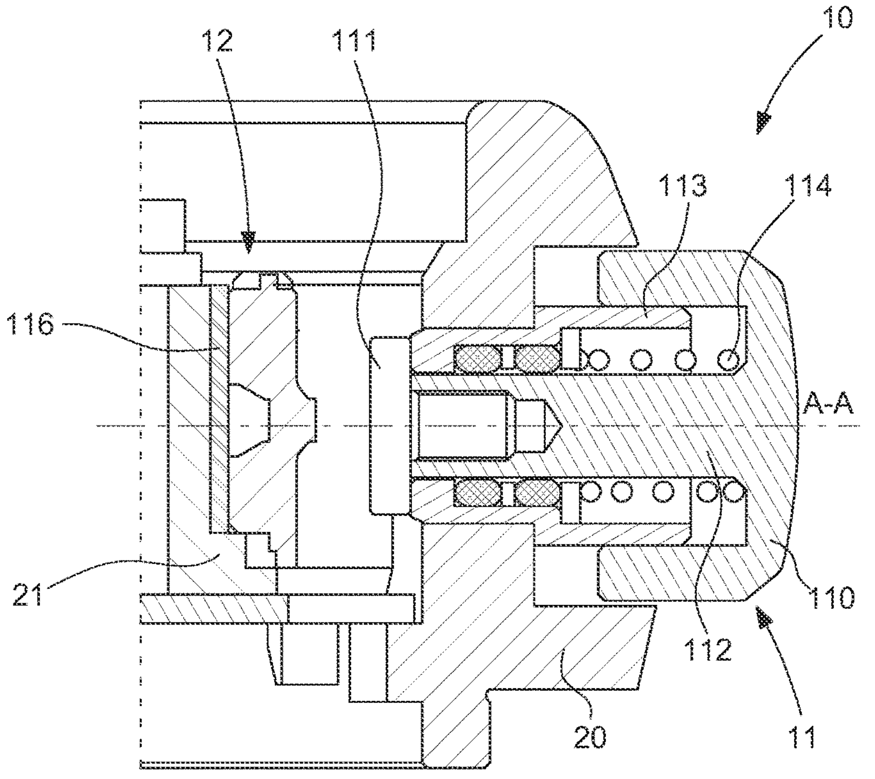
FIG. 2 shows a view in cross section of a middle of a watch in which an electronic horological movement is housed comprising a control module according to an example embodiment of the invention.

In the example embodiment of the invention shown on FIG. 2 and described in the present text, the invention is applied to the horology field. In particular, the invention relates to a control module 10 here arranged in an electronic horological movement housed in a case of a watch, provided with a middle 20, and intended for controlling a function as required for example by a user.

Figure 1:
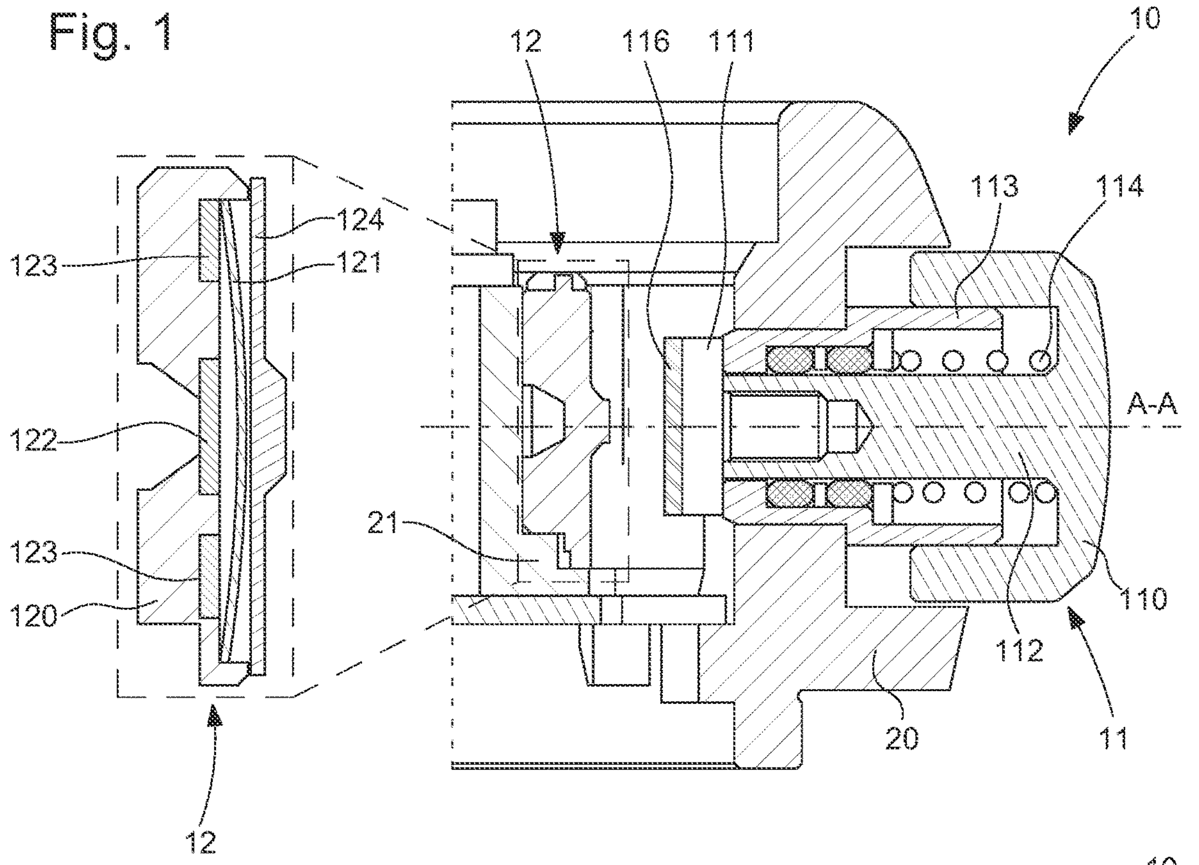
FIG. 1 shows schematically a view in cross section of a middle of a watch in which an electronic horological movement is housed comprising a control module according to an example embodiment not covered by the present invention and a detail view of a switch of the control module.

As can be seen on FIGS. 1 and 2, the control module 10 comprises a push-piece 11 able to move in translation in a direction A-A, intended to be acted on by the user. In the particular examples shown on the figures, the push-piece 11 is engaged through the middle 20 in order to be accessible to the user. Alternatively, the push-piece can be rotatable or more generally can be driven in any type of movement.

The control module 10 furthermore includes a switch 12 intended to be actuated by a user when acting on the push-piece 11. In particular, the switch 12 is adapted to occupy a connected state and an idle state, the push-piece 11 being configured to, when it actuates said switch 12, drive it into one or other of these states.

As is shown schematically by the detail view in FIG. 1 in an example embodiment not covered by the present invention, the switch 12 can comprise a frame 120 to which an elastic blade 121 produced from electrically conductive material and connection terminals 122 and 123 are secured. As can be seen on the detail view in FIG. 1, the switch 12 can comprise a connection terminal referred to as "central terminal" 122 arranged on the direction of travel of the push-piece 11, i.e. in alignment with the direction A-A, and one or more peripheral terminals 123. Preferentially, the elastic blade 121 is configured to occupy, when the push-piece 11 is acted on by the user, a connection position in which it gives rise to contact between the central terminal 122 and the peripheral terminal or terminals 123.

In particular, when the user acts on the push-piece 11, the latter applies a pressure to the elastic blade 121, so as to deform it into an unstable flat position in which it is in contact with all the central 122 and peripheral 123 terminals. The elastic blade 121 is also configured to occupy, when the push-piece 11 is not acted on by the user, a stable idle position in which it prevents contact between the central 122 and peripheral 123 terminals. As can be seen on the detail view in FIG. 1, when it is in this position, the elastic blade 121 can be curved so as to be prestressed to have elastic characteristics.

The switch 12 can also include a flexible membrane 124 covering the elastic blade 121, on which the push-piece 11 is intended to bear when it is acted on. However, this flexible membrane 124 is not essential to the invention.

The push-piece 11 comprises a pusher head 110 extending outside the middle 20 and intended to be manipulated by the user. The push-piece 11 also includes a striker element 111 connected to the pusher head 110 by means of a pusher rod 112 slidably engaged in a guide tube 113 secured in a through opening of the middle 20. For example, the striker element 111 is screwed into the pusher rod 112, or is secured by any suitable means within the capability of a person skilled in the art.

The guide tube 113 includes, at a first end, a first portion by means of which it is engaged in the through opening in the middle 20, and includes, at a second end, a second portion having an outside diameter greater than that of the first portion so as to form a shoulder with the latter. As shown by FIG. 1, the guide tube 113 is arranged in abutment against the middle 20 by means of this shoulder. The push-piece 11 comprises a spring 114 working in compression, interposed between the pusher head 110 and the shoulder of the guide tube 113 so as to force the push-piece 11 to move into an idle position.

As illustrated on FIG. 1, the striker element 111 rests in abutment against the first end of the guide tube 113 when the push-piece 11 occupies its idle position.

The striker element 111 includes a body with a substantially cylindrical shape comprising a radial dimension extending in a direction orthogonal to the direction A-A, said radial dimension advantageously being less than the outside diameter of the first portion of the guide tube 113. This feature facilitates the assembly of the striker element 111 on the pusher rod 112, since it can be implemented before the push-piece 11 is secured to the middle 20 of the watch, i.e. before it is engaged in the through opening in said middle 20.

In this example embodiment shown on FIG. 1, the body of the striker element 111 is provided with an abutment surface intended to apply, directly or indirectly, a pressure to the elastic blade 121 when the push-piece 11 is acted on by the user, in order to cause the deformation thereof until it occupies the connection position.

Advantageously, the control module 10 includes a shock absorber 116 configured to absorb a part of the forces involved when the push-piece 11 actuates the switch 12, by elastically deforming, at least when said forces are above a predetermined threshold. The shock absorber 116 is therefore formed from elastically deformable material, such as elastomer, or has an elastically deformable structure, such as a compression spring.

In the example embodiment shown on FIG. 1, the shock absorber 116 is arranged on the bearing surface so as to be forced under compression against the switch when the striker drives the switch 12 into the connected state or into the idle state. In particular, when the push-piece 11 is acted on, the shock absorber 116 applies a pressure on the switch 12 in order to drive it into the connected state or into the idle state. In this example embodiment, the shock absorber 116 is preferentially in the form of a disc with a suitable thickness for absorbing a not insignificant part of the forces involved while transmitting another part of these forces to the switch 12 to make it change state.

In the example embodiment of the invention shown on FIG. 2, the shock absorber 116 is arranged between the structure 21 of the horological movement and the switch 12, in line with the direction A-A; the switch 12 is thus interposed between the shock absorber 116 and the push-piece 11. In other words, the shock absorber 116 is arranged at the rear of the switch 12, against it, if it is considered that the front of the switch 12 is facing the push-piece 11.

Thus, if the switch 12 were subjected to excessive forces, it would be able to transmit part of these forces by locally moving or deforming slightly in the shock absorber 116, which would absorb part of the forces transmitted by the switch 12.

The description of the invention is made in the context of an application of the invention to an electronic appliance formed by a watch. However, it goes without saying that the invention is not limited to this application and that it could advantageously be used with any other electronic appliance, portable or not.

More generally, it should be noted that the implementations and embodiments considered above have been described by way of non-limiting examples, and that other variants are consequently possible.

The invention claimed is:

1. A control module (10) of an electronic appliance including a push-piece (11), the control module comprising:

a striker (111);

a switch (12) adapted to occupy a connected state and an idle state, wherein said striker (111) is configured to drive the switch (12) into the connected state or into the idle state when the push-piece (11) is acted on; and a shock absorber (116) configured to absorb, by deforming elastically, a part of the forces involved when the striker (111) drives the switch (12) into the connected state or into the idle state, at least when said forces are above a predetermined threshold, the shock absorber (116) being arranged between a structure (21) of a horological movement and the switch (12), in line with the direction of travel of the push-piece (11), such that the switch (12) is interposed between the striker (111) and the shock absorber (116), wherein the switch (12) includes a frame (120) against which the shock absorber (116) is arranged in abutment such that the switch (12) transmits the part of the forces to the shock absorber (116) by locally moving or deforming in the shock absorber (116).

2. The control module (10) according to claim 1, wherein the shock absorber (116) is in the form of a disc.

3. The control module (10) according to claim 1, wherein the switch (12) comprises connection terminals (122, 123) and an elastic blade (121) all secured to the frame (120), the elastic blade (121) being moved into a connection position in which it gives rise to contact between the connection terminals (122, 123) when the switch (12) is in the connection state, and being moved into an idle state in which it prevents contact between the connection terminals (122, 123) when the switch is in the idle state, the shock absorber (116) being arranged against at least one of the connection terminals (122, 123) so that the latter is interposed between the shock absorber (116) and the striker (111).

4. The control module (10) according to claim 1, wherein the push-piece (11) comprises a pusher head (110) to which a pusher rod (112) slidably engaged in a guide tube (113) is connected and comprising a free end to which the striker (111) is secured, the push-piece (11) comprising a spring (114) interposed between the pusher head (110) and the guide tube (113) so as to force the push-piece (11) to move towards an idle position.

5. The control module (10) according to claim 4, wherein the striker (111) includes a body with a substantially cylindrical shape comprising a radial dimension extending in a direction orthogonal to the direction of movement of the push-piece (11), said radial dimension being less than the outside diameter of an end of the guide tube (113) at which the striker is arranged.

6. A watch comprising a case in which the horological movement is housed, the watch including the control module (10) according to claim 1, the push-piece (11) being engaged through a middle (20) with which the case is provided and the switch (12) being secured to the structure (21) of the horological movement.

7. The control module (10) according to claim 1, wherein the shock absorber (116) is arranged between the structure (21) of the horological movement and the frame (120) of the switch (12).

8. The control module (10) according to claim 1, wherein the shock absorber (116) is separate from the switch (12).

* * * * *